(12) United States Patent
Kaneko et al.

(10) Patent No.: US 12,227,629 B2
(45) Date of Patent: Feb. 18, 2025

(54) HEAT-SHRINKABLE FILM AND HEAT-SHRINKABLE LABEL

(71) Applicant: C.I. TAKIRON CORPORATION, Osaka (JP)

(72) Inventors: Takuma Kaneko, Osaka (JP); Masahiro Watanabe, Osaka (JP); Yuichiro Kanzaka, Osaka (JP); Shuuta Yuge, Osaka (JP)

(73) Assignee: C.I. TAKIRON CORPORATION, Osaka (JP)

( * ) Notice: Subject to any disclaimer, the term of this patent is extended or adjusted under 35 U.S.C. 154(b) by 1032 days.

(21) Appl. No.: 17/059,151

(22) PCT Filed: May 29, 2019

(86) PCT No.: PCT/JP2019/021402
§ 371 (c)(1),
(2) Date: Nov. 25, 2020

(87) PCT Pub. No.: WO2019/230843
PCT Pub. Date: Dec. 5, 2019

(65) Prior Publication Data
US 2021/0214583 A1    Jul. 15, 2021

(30) Foreign Application Priority Data

May 29, 2018    (JP) .................................. 2018-102332

(51) Int. Cl.
*C08J 7/043* (2020.01)
*B29C 55/14* (2006.01)
(Continued)

(52) U.S. Cl.
CPC .............. *C08J 7/043* (2020.01); *B29C 55/14* (2013.01); *B29C 61/02* (2013.01); *C08J 5/18* (2013.01);
(Continued)

(58) Field of Classification Search
None
See application file for complete search history.

(56) References Cited

U.S. PATENT DOCUMENTS 4,939,232 A * 7/1990 Fukuda ................. B29C 55/005
528/304
4,963,418 A * 10/1990 Isaka .......................... C08J 5/18
528/304
(Continued)

FOREIGN PATENT DOCUMENTS

JP    2002203525 A    7/2002
JP    2003071926 A    3/2003
(Continued)

OTHER PUBLICATIONS

Translation of International Search Report from corresponding JP Patent Application No. PCT/JP2019/021402, mailed Jul. 30, 2019, 4 pages.
(Continued)

*Primary Examiner* — Vivian Chen
(74) *Attorney, Agent, or Firm* — Lee & Hayes, P.C.

(57) ABSTRACT

What is provided is a heat-shrinkable film and a heat-shrinkable label that, when applied to a container in which the difference between the diameter of the body portion and the diameter of the mouth portion is large, sufficiently shrink in the mouth portion and do not easily allow the generation of a wrinkle or a sink mark in the mouth portion. The heat-shrinkable film contains polyester, a dicarboxylic acid component that constitutes the polyester contains 95 mol % or more of terephthalic acid, and a diol component that constitutes the polyester contains 50 mol % or more of ethylene glycol and 15 mol % or more of cyclohexanedimethanol. The shrinkage rate in the primary shrinkage direction when the heat-shrinkable film is immersed in hot water at 70° C. for 30 seconds is 20% or less, the shrinkage (Continued)

rate in the primary shrinkage direction when the heat-shrinkable film is immersed in hot water at 80° C. for 30 seconds is 45% to 65%, and the shrinkage rate in the primary shrinkage direction when the heat-shrinkable film is immersed in hot water at 98° C. for 30 seconds is 65% or more.

7 Claims, 1 Drawing Sheet

(51) Int. Cl.
| | |
|---|---|
| B29C 61/02 | (2006.01) |
| B29K 105/02 | (2006.01) |
| B29L 31/00 | (2006.01) |
| B32B 7/028 | (2019.01) |
| B32B 27/36 | (2006.01) |
| C08G 63/12 | (2006.01) |
| C08G 63/127 | (2006.01) |
| C08G 63/137 | (2006.01) |
| C08G 63/16 | (2006.01) |
| C08G 63/183 | (2006.01) |
| C08G 63/199 | (2006.01) |
| C08J 5/18 | (2006.01) |
| C08K 3/36 | (2006.01) |
| C08L 67/02 | (2006.01) |
| C08L 67/03 | (2006.01) |
| C09J 7/25 | (2018.01) |
| C09J 7/38 | (2018.01) |
| G09F 3/00 | (2006.01) |
| G09F 3/02 | (2006.01) |

(52) U.S. Cl.
CPC .............. *C09J 7/255* (2018.01); *C09J 7/385* (2018.01); *G09F 3/0291* (2013.01); *B29K 2105/02* (2013.01); *B29L 2031/744* (2013.01); *B32B 7/028* (2019.01); *B32B 27/36* (2013.01); *C08G 63/12* (2013.01); *C08G 63/127* (2013.01); *C08G 63/137* (2013.01); *C08G 63/16* (2013.01); *C08G 63/183* (2013.01); *C08G 63/199* (2013.01); *C08J 2333/08* (2013.01); *C08J 2367/02* (2013.01); *C08K 3/36* (2013.01); *C08L 67/02* (2013.01); *C08L 67/03* (2013.01); *C09J 2203/334* (2013.01); *C09J 2301/122* (2020.08); *C09J 2301/312* (2020.08); *C09J 2301/41* (2020.08); *C09J 2400/10* (2013.01); *C09J 2433/00* (2013.01); *C09J 2467/006* (2013.01); *G09F 2003/023* (2013.01); *G09F 2003/0251* (2013.01); *G09F 2003/0273* (2013.01)

(56) References Cited

U.S. PATENT DOCUMENTS

| | | | |
|---|---|---|---|
| 5,985,387 A * | 11/1999 | Mori | B29C 61/003 428/339 |
| 8,685,305 B2 * | 4/2014 | Haruta | B29C 55/143 264/211.13 |
| 9,267,008 B2 * | 2/2016 | Shiraishi | C08J 5/18 |
| 2005/0196563 A1 * | 9/2005 | Ito | C08J 5/18 428/34.1 |
| 2009/0227735 A1 * | 9/2009 | Shih | C08J 5/18 525/190 |
| 2011/0130480 A1 * | 6/2011 | Bayer | C08L 67/02 521/182 |
| 2016/0090456 A1 * | 3/2016 | Ishimaru | C08G 63/60 428/156 |
| 2016/0137833 A1 * | 5/2016 | Haruta | B29C 55/14 206/459.5 |
| 2019/0211146 A1 * | 7/2019 | Williams | B29C 55/08 |
| 2019/0330442 A1 * | 10/2019 | Shin | B29B 7/885 |
| 2020/0114614 A1 * | 4/2020 | Peters | C08G 63/199 |
| 2020/0115520 A1 * | 4/2020 | Shin | B29B 7/726 |
| 2021/0054140 A1 * | 2/2021 | Shin | B29B 17/04 |
| 2023/0045508 A1 * | 2/2023 | Chen | C08J 5/18 |

FOREIGN PATENT DOCUMENTS

| | | |
|---|---|---|
| JP | 2003266537 A | 9/2003 |
| JP | 2014012379 A | 1/2014 |
| WO | WO2010056271 A1 | 5/2010 |
| WO | WO2013056011 A1 | 4/2013 |

OTHER PUBLICATIONS

JP2012507594, a corresponding document, WO2010056271, published May 20, 2010, which is cited in this IDS.
JP2014534911, a corresponding document of WO2013056011, published Apr. 18, 2013, which is cited in this IDS.

* cited by examiner

HEAT-SHRINKABLE FILM AND HEAT-SHRINKABLE LABEL

This Application claims priority to and is a national phase of International Application No. PCT/JP2019/021402, filed May 29, 2019, which claims priority to Japan Patent Application No. 2018-102332, filed May 29, 2018, which are incorporated herein by reference.

TECHNICAL FIELD

The present invention relates to a heat-shrinkable film and a heat-shrinkable label.

BACKGROUND ART

As a label for containers such as bottles, a heat-shrinkable label having an adhesive layer provided on one surface of a heat-shrinkable film is used.

The heat-shrinkable label is put into a well-known label application device such as a roll-on shrink application machine and is applied to a container.

A label is applied to a container using a label application device as follows.

While the container is conveyed, a heat-shrinkable label from which a release paper has been peeled off is pressed against the container such that the adhesive layer of the heat-shrinkable label comes into contact with the container. When the container against which the heat-shrinkable label is pressed rotates around the central axis of the container, the heat-shrinkable label is wrapped around the container.

While the container is rotated around the central axis of the container, hot air is blown from a blower to the heat-shrinkable label wrapped around the container, and the heat-shrinkable label is shrunk in accordance with the shape of the container.

In containers such as bottles, it is common that the diameter of the body portion and the diameter of the mouth portion differ from each other. Particularly, in a vial bottle as shown in FIG. 1, the difference between the diameter of the body portion and the diameter of the mouth portion is large. Therefore, as shown in FIG. 1, in a case where a label is applied from a body portion 102 through a mouth portion 104 of a container 100, when a heat-shrinkable label 200 is wrapped around the body portion 102 of the container 100, a large gap is generated between the container 100 and the heat-shrinkable label 200 in the mouth portion 104 of the container 100. Therefore, it is necessary to significantly shrink the heat-shrinkable label 200 in the mouth portion 104. Therefore, in a case where a label is also applied to the mouth portion of a container, there is a need for a heat-shrinkable film having a high shrinkage rate in the circumferential direction of the container (the longitudinal direction of the heat-shrinkable label).

As the heat-shrinkable film having a high shrinkage rate, proposed is the following heat-shrinkable film.

A heat-shrinkable polyester-based film made of a polyester resin containing 15 mol % or more of a 1,4-cyclohexanedimethanol component in 100 mol % of a polyhydric alcohol component in all polyester resin components, in which the hot water shrinkage rate of the polyester-based film is 5% to 60% at a treatment temperature of 70° C. for a treatment time of five seconds and 75% or more at 85° C. for five seconds in a primary shrinkage direction and is 10% or less at 85° C. for five seconds in a direction orthogonal to the primary shrinkage direction (Patent Document 1).

CITATION LIST

Patent Literature

Patent Document 1

Japanese Unexamined Patent Application, First Publication No. 2003-266537

SUMMARY OF INVENTION

Technical Problem

As the capacity of the vial bottle increases, the difference between the diameter of the body portion and the diameter of the mouth portion becomes larger. In the case of using a heat-shrinkable label made of the heat-shrinkable film described in Patent Document 1 for such a container in which the difference between the diameter of the body portion and the diameter of the mouth portion is large, a wrinkle or a sink mark is generated on the label in the mouth portion.

The present invention provides a heat-shrinkable film and a heat-shrinkable label that, when applied to a container in which the difference between the diameter of the body portion and the diameter of the mouth portion is large, sufficiently shrink in the mouth portion and do not easily allow the generation of a wrinkle or a sink mark in the mouth portion.

Solution to Problem

The present invention has the following aspects.

<1> A heat-shrinkable film containing polyester, in which a dicarboxylic acid component that constitutes the polyester contains 95 mol % or more of terephthalic acid, a diol component that constitutes the polyester contains 50 mol % or more of ethylene glycol and 15 mol % or more of cyclohexanedimethanol, a shrinkage rate in a primary shrinkage direction when the heat-shrinkable film is immersed in hot water at 70° C. for 30 seconds is 20% or less, a shrinkage rate in the primary shrinkage direction when the heat-shrinkable film is immersed in hot water at 80° C. for 30 seconds is 45% to 65%, and a shrinkage rate in the primary shrinkage direction when the heat-shrinkable film is immersed in hot water at 98° C. for 30 seconds is 65% or more.

<2> The heat-shrinkable film according to <1>, in which the diol component that constitutes the polyester contains 61 to 77.9 mol % of ethylene glycol, 22 to 29 mol % of cyclohexanedimethanol, and 0.1 to 10 mol % of diethylene glycol.

<3> The heat-shrinkable film according to <1> or <2>, in which the polyester has a glass transition temperature of 63° C. to 85° C.

<4> The heat-shrinkable film according to any one of <1> to <3>, further containing inert particles.

<5> The heat-shrinkable film according to <4>, in which the inert particles have an average particle diameter of 1.5 to 3.0 μm.

<6> The heat-shrinkable film according to <4> or <5>, in which a proportion of the inert particles in the heat-shrinkable film is 0.01 to 0.08 mass %.

<7> A heat-shrinkable label having the heat-shrinkable film according to any one of <1> to <6> and an adhesive layer provided on one surface of the heat-shrinkable film.

Advantageous Effects of Invention

When applied to a container in which the difference between the diameter of the body portion and the diameter of the mouth portion is large, the heat-shrinkable film and the heat-shrinkable label of the present invention sufficiently shrink in the mouth portion and do not easily allow the generation of a wrinkle or a sink mark in the mouth portion.

DESCRIPTION OF EMBODIMENTS

Figure 1:
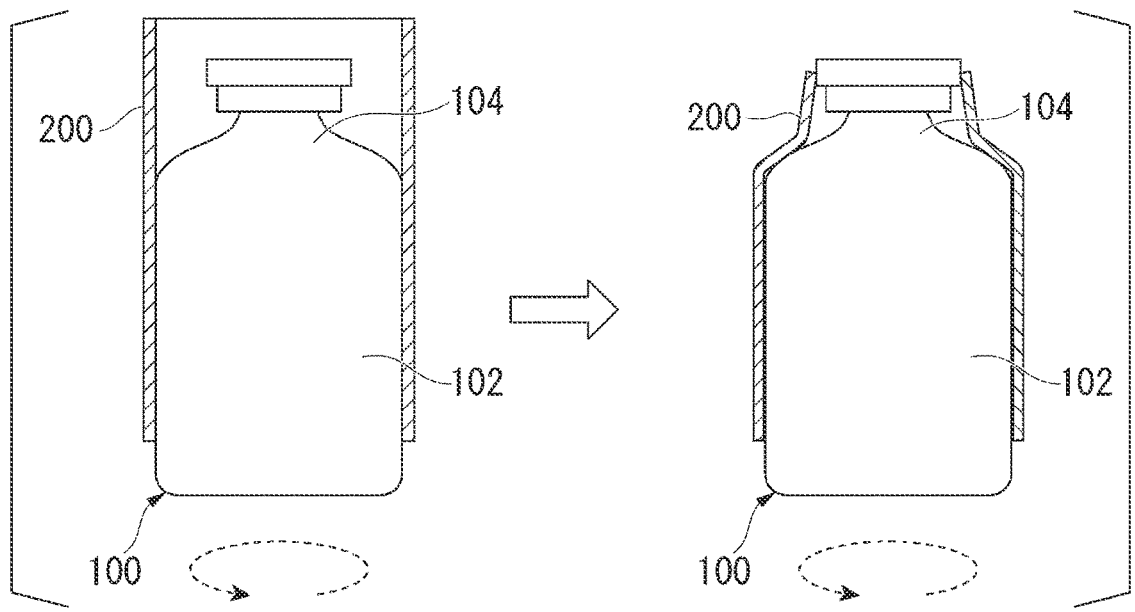
FIG. 1 is side views showing the appearance of a heat-shrinkable label wrapped around a container being shrunk (cross-sectional views of the heat-shrinkable label alone).

The definitions of the following terms shall apply to the present specification and the claims.

The shrinkage rate is a value measured using hot water as a heat-transfer fluid according to JIS Z 1709-1995.

The glass transition temperature (Tg) is a midpoint glass transition temperature measured by the differential scanning calorimetry (DSC) method according to JIS K 7121-1987 (corresponding to the International standard ISO 3146).

The average particle diameter is a volume-based cumulative 50% diameter measured by the laser diffraction/scattering method. "To" used to indicate numerical ranges means that the numerical values before and after "to" are included as the lower limit value and the upper limit value.
<Heat-Shrinkable Film>

A heat-shrinkable film of the present invention contains polyester.

The heat-shrinkable film of the present invention preferably further contains inert particles.

The heat-shrinkable film of the present invention may contain components other than the polyester and the inert particles (hereinafter, also referred to as "other components") as necessary as long as the effect of the present invention is not impaired.
(Polyester)

The polyester is obtained by the polycondensation of a dicarboxylic acid component and a diol component.

The dicarboxylic acid component that constitutes the polyester contains 95 mol % or more of terephthalic acid, and the diol component that constitutes the polyester contains 50 mol % or more of ethylene glycol and 15 mol % or more of cyclohexanedimethanol. The polyester containing 95 mol % or more of terephthalic acid as the dicarboxylic acid component and 50 mol % or more of ethylene glycol and 15 mol % or more of cyclohexanedimethanol as the diol component has low crystallinity and thus has an appropriate heat-shrinkable property and an appropriate heat shrinkage start temperature and is transparent enough for clear container label designs.

Examples of dicarboxylic acid components other than terephthalic acid include aliphatic dicarboxylic acids (adipic acid, azelaic acid, and the like), aromatic dicarboxylic acids (naphthalenedicarboxylic acid, isophthalic acid, and the like), alicyclic dicarboxylic acids (1,4-cyclohexanedicarboxylic acid and the like), ester-forming derivatives thereof, and the like.

The dicarboxylic acid component that constitutes the polyester may contain up to approximately 5 mol % of the dicarboxylic acid components other than terephthalic acid.

Examples of diol components other than ethylene glycol include aliphatic diols (diethylene glycol, propanediol, butanediol, neopentyl glycol, hexanediol, and the like), alicyclic diols (1,4-cyclohexanedimethanol and the like), aromatic diols, and the like.

The proportion of the ethylene glycol in the diol components that constitute the polyester is 50 mol % or more, preferably 50 to 80 mol %, and more preferably 60 to 75 mol %.

The proportion of the diol components other than ethylene glycol in the diol components that constitute the polyester is preferably 20 mol % or more, more preferably 20 to 50 mol %, and still more preferably 25 to 40 mol %.

The diol components that constitute the polyester preferably contain 61 to 77.9 mol % of ethylene glycol, 22 to 29 mol % of cyclohexanedimethanol, and 0.1 to 10 mol % of diethylene glycol, more preferably contain 65 to 73 mol % of ethylene glycol, 23 to 29 mol % of cyclohexanedimethanol, and 1 mol % or more of diethylene glycol, and still more preferably contain 67 to 71 mol % of ethylene glycol, 24 to 28 mol % of cyclohexanedimethanol, and 3 to 7 mol % of diethylene glycol.

When the proportion of the ethylene glycol is not less than the lower limit value of the above-described range, the heat-shrinkable film is less likely to unevenly stretch in a stretching step. When the proportion of the ethylene glycol is not more than the upper limit value of the above-described range, the crystallinity becomes low, and a high shrinkage rate is easily obtained.

When the proportion of the cyclohexanedimethanol is not less than the lower limit value of the above-described range, it is easy to obtain a heat-shrinkable film that, when applied to a container in which the difference between the diameter of the body portion and the diameter of the mouth portion is large, does not easily allow the generation of a wrinkle or a sink mark in the mouth portion. When the proportion of the cyclohexanedimethanol is not more than the upper limit value of the above-described range, the heat-shrinkable film is less likely to unevenly stretch in a stretching step.

When the proportion of the diethylene glycol is not less than the lower limit value of the above-described range, it is possible to lower the processing temperature. When the proportion of the diethylene glycol is not more than the upper limit value of the above-described range, the heat-shrinkable film is less likely to unevenly stretch in a stretching step.

The Tg of the polyester is preferably 63° C. to 85° C. more preferably 70° C. to 85° C., and still more preferably 78° C. to 85° C. When the Tg is not lower than the lower limit value of the above-described range, it is difficult to relax the orientation during the storage of the heat-shrinkable film and to decrease the heat-shrinkage rate. When the Tg is not higher than the upper limit value of the above-described range, the heat shrinkage start temperature of the heat-shrinkable film does not become too high, and it becomes easy to apply the heat-shrinkable film to containers.

One kind of polyester may be used singly or two or more kinds of polyesters may be mixed together and used.

In a case where two or more kinds of polyesters are mixed together and used, the proportion of each component that constitutes the polyester and the glass transition temperature need to be within the above-described ranges for a polyester as a whole that is obtained by mixing together the two or more kinds of polyesters.

(Inert Particles)

The inert particles are a component that improve the printability, travelling performance, and the like of the heat-shrinkable film.

Examples of the inert particles include inorganic fine particles (silicon dioxide, calcium carbonate, titanium oxide, kaolin, barium sulfate, and the like), organic fine particles (spherical silicone, spherical polystyrene, copolymers of acrylic acid ester and styrene, and the like), and the like. As the inert particles, silicon dioxide is preferable because it is possible to sufficiently improve the printability, travelling performance, and the like of the heat-shrinkable film and the economic efficiency is also excellent.

The average particle diameter of the inert particles is preferably 1.5 to 3.0 µm. When the average particle diameter of the inert particles is not less than the lower limit value of the above-described range, the sliding property of the heat-shrinkable film improves, a wrinkle is less likely to be generated during the travelling of the film such as during printing or during the application to containers, and the travelling performance improves. In addition, since heat-shrinkable films having favorable travelling performance are less likely to deform, the printability or the adhesion also improves. When the average particle diameter of the inert particles is not more than the upper limit value of the above-described range, a printed dot is less likely to be missed when fine printing is performed on the heat-shrinkable film, and the printability is excellent.

The proportion of the inert particles in the heat-shrinkable film is preferably 0.01 to 0.08 mass %. When the proportion of the inert particles is not less than the lower limit value of the above-described range, the sliding property of the heat-shrinkable film improves, a wrinkle is less likely to be generated during the travelling of the film such as during printing or during the application to containers, and the travelling performance improves. In addition, since heat-shrinkable films having favorable travelling performance are less likely to deform, the printability or the adhesion also improves. When the proportion of the inert particles is not more than the upper limit value of the above-described range, a printed dot is less likely to be missed when fine printing is performed on the heat-shrinkable film, and the printability is excellent.

(Other Components)

Examples of other components include an organic lubricant (long-chain aliphatic acid ester or the like), a stabilizer, a colorant, an antioxidant, a defoamer, an antistatic agent, an ultraviolet absorber, and the like.

The proportion of other components in the heat-shrinkable film is preferably 0 to 5 mass %.

(Shrinkage Rate)

When the heat-shrinkable film is immersed in hot water at 70° C. for 30 seconds, the shrinkage rate in the primary shrinkage direction is 20% or less, preferably 10% to 20%, and more preferably 15% to 20%. When the shrinkage rate in the primary shrinkage direction when the heat-shrinkable film is immersed in hot water at 70° C. for 30 seconds is within the above-described range, the shrinkage of the heat-shrinkable film becomes mild in a relatively low temperature range, and the heat-shrinkable film shrinks slowly. Therefore, when the heat-shrinkable film is applied to a container in which the difference between the diameter of the body portion and the diameter of the mouth portion is large, a wrinkle or a sink mark is less likely to be generated in the mouth portion.

In order to regulate the shrinkage rate in the primary shrinkage direction when the heat-shrinkable film is immersed in hot water at 70° C. for 30 seconds to 20% or less, it is necessary to set the proportion of the cyclohexanedimethanol in the diol components that constitute the polyester within the above-described range and to adjust the stretching conditions (the stretching ratio, the stretching temperature, and the like) at the time of producing the heat-shrinkable film within ranges described below.

When the heat-shrinkable film is immersed in hot water at 80° C. for 30 seconds, the shrinkage rate in the primary shrinkage direction is 45% to 65%, preferably 45% to 60%, and more preferably 50% to 55%. When the shrinkage rate in the primary shrinkage direction when the heat-shrinkable film is immersed in hot water at 80° C. for 30 seconds is within the above-described range, the shrinkage of the heat-shrinkable film becomes mild in a range of 70° C. to 80° C., and the heat-shrinkable film shrinks slowly. Therefore, when the heat-shrinkable film is applied to a container in which the difference between the diameter of the body portion and the diameter of the mouth portion is large, a wrinkle or a sink mark is less likely to be generated in the mouth portion.

In order to regulate the shrinkage rate in the primary shrinkage direction when the heat-shrinkable film is immersed in hot water at 80° C. for 30 seconds to 45% to 65%, it is necessary to set the proportion of the cyclohexanedimethanol in the diol components that constitute the polyester within the above-described range and to adjust the stretching conditions (the stretching ratio, the stretching temperature, and the like) at the time of producing the heat-shrinkable film within the ranges described below.

When the heat-shrinkable film is immersed in hot water at 98° C. for 30 seconds, the shrinkage rate in the primary shrinkage direction is 65% or more and preferably 70% to 75%. When the shrinkage rate in the primary shrinkage direction when the heat-shrinkable film is immersed in hot water at 98° C. for 30 seconds is not less than the lower limit value of the above-described range, the heat-shrinkable film sufficiently shrinks in the mouth portion at the time of being applied to a container in which the difference between the diameter of the body portion and the diameter of the mouth portion is large. When the shrinkage rate in the primary shrinkage direction when the heat-shrinkable film is immersed in hot water at 98° C. for 30 seconds is not more than the upper limit value of the above-described range, the heat-shrinkable film does not excessively shrink, and thus a split, a kink, a wrinkle, or the like is less likely to be generated in the heat-shrinkable film.

In order to regulate the shrinkage rate in the primary shrinkage direction when the heat-shrinkable film is immersed in hot water at 98° C. for 30 seconds to 65% or more, it is necessary to adjust the stretching conditions (the stretching ratio, the stretching temperature, and the like) at the time of producing the heat-shrinkable film within ranges described below.

When the heat-shrinkable film is immersed in hot water at 98° C. for 30 seconds, the shrinkage rate in a direction orthogonal to the primary shrinkage direction is preferably 0% to 10% and more preferably 5% to 8%. When the shrinkage rate in the direction orthogonal to the primary shrinkage direction when the heat-shrinkable film is immersed in hot water at 98° C. for 30 seconds is not less than the lower limit value of the above-described range, during the shrinkage of the heat-shrinkable film, the heat-shrinkable film does not elongate in the direction orthogonal to the primary shrinkage direction, and a shrinkage unevenness, a wrinkle, or like is less likely to be generated in the vertical direction of the container. When the shrinkage rate in the direction orthogonal to the primary shrinkage direction when the heat-shrinkable film is immersed in hot water at 98° C. for 30 seconds is not more than the upper limit value of the above-described range, during the shrinkage of the heat-shrinkable film, the shrinkage of the heat-shrinkable film in the width direction is suppressed, and a sink mark is less likely to be generated in the vertical direction of the container.

In order to regulate the shrinkage rate in the direction orthogonal to the primary shrinkage direction when the heat-shrinkable film is immersed in hot water at 98° C. for 30 seconds to 0% to 10%, it is necessary to adjust the stretching conditions (the stretching ratio, the stretching temperature, and the like) at the time of producing the heat-shrinkable film within ranges described below.

The thickness of the heat-shrinkable film is preferably 15 to 80 μm. When the thickness of the heat-shrinkable film is not less than the lower limit value of the above-described range, it is easy to produce the heat-shrinkable film. When the thickness of the heat-shrinkable film is not more than the upper limit value of the above-described range, the amount of a resin used per label area is suppressed, and the economic efficiency is favorable.

(Method for Producing Heat-Shrinkable Film)

The heat-shrinkable film of the present invention is produced by a method having an extrusion forming step of melt-extruding a resin material containing polyester to obtain an unstretched film, a stretching step of stretching the unstretched film in the longitudinal direction and then stretching the unstretched film in the width direction to obtain a stretched film, and a thermal treatment step of thermally treating the stretched film.

In the extrusion forming step, for example, a resin material is melted with an extruder and is discharged from a T-die onto a cast roll. The melting temperature is, for example, 230° C. to 300° C. The temperature of the cast roll is preferably near room temperature.

As a vertical stretching device that is used to stretch the unstretched film in the longitudinal direction in the stretching step, devices including a heating roll group that rotates at a low speed and a non-heating roll group that rotates at a higher speed than the heating roll group and configured to vertically stretch the film using the difference in rotation speed between the roll groups are exemplary examples.

The stretch ratio at the time of stretching the unstretched film in the longitudinal direction is preferably 3.5 to 5 times and more preferably 4 to 4.5 times. When the stretch ratio at the time of stretching the unstretched film in the longitudinal direction is not less than the lower limit value of the above-described range, it is easy to produce heat-shrinkable films having a shrinkage rate in the primary shrinkage direction at the time of being immersed in hot water at 98° C. for 30 seconds of 65% or more. When the stretch ratio when the unstretched film is stretched in the longitudinal direction is not more than the upper limit of the above-described range, whitening or breakage of the film is unlikely to occur during stretching.

The stretching temperature at the time of stretching the unstretched film in the longitudinal direction is preferably a temperature higher than the Tg by 5° C. to 15° C. and more preferably a temperature higher than the Tg by 7° C. to 12° C. When the stretching temperature at the time of stretching the unstretched film in the longitudinal direction is not lower than the lower limit value of the above-described range, the unstretched film is less likely to whiten or break during stretching. When the stretching temperature at the time of stretching the unstretched film in the longitudinal direction is not higher than the upper limit value of the above-described range, a trouble attributed to the pressure-sensitive adhesion of the unstretched film to a stretching device due to the softening of the resin is less likely to be caused.

As a horizontal stretching device that is used to stretch the unstretched film in the width direction in the stretching step, tenter devices configured to horizontally stretching the unstretched film by grasping both end portions of the unstretched film in the width direction with clips are exemplary examples.

The stretch ratio at the time of stretching the unstretched film in the width direction is preferably 1 to 1.3 times and more preferably 1 to 1.1 times. When the stretch ratio at the time of stretching the unstretched film in the width direction is not less than the lower limit value of the above-described range, the evenness of the thickness of the film in the width direction is improved, which is preferable. When the stretch ratio at the time of stretching the unstretched film in the width direction is not more than the upper limit value of the above-described range, the shrinkage of the film in the width direction is suppressed, and a sink mark is less likely to be generated in the vertical direction of the container.

The stretching temperature at the time of stretching the unstretched film in the width direction is preferably a temperature higher than the Tg by −5° C. to 10° C. and more preferably a temperature higher than the Tg by −5° C. to 5° C. When the stretching temperature at the time of stretching the unstretched film in the width direction is not lower than the lower limit value of the above-described range, the unstretched film is less likely to whiten or break during stretching. When the stretching temperature at the time of stretching the unstretched film in the width direction is not higher than the upper limit value of the above-described range, it is easy to produce heat-shrinkable films having a shrinkage rate in the primary shrinkage direction at the time of being immersed in hot water at 98° C. for 30 seconds of 65% or more.

In the thermal treatment step, a thermal treatment is preferably performed in a state where both end portions of the stretched film in the width direction are grasped with clips. Such a thermal treatment is preferably performed in, for example, a thermal treatment zone supplementarily provided following horizontal stretching in a tenter device that is used in the horizontal stretching device.

The thermal treatment temperature is preferably a temperature higher than the stretching temperature at the time of stretching the unstretched film in the width direction by 0° C. to 20° C. and more preferably a temperature higher than the stretching temperature at the time of stretching the unstretched film in the width direction by 5° C. to 15° C. When the thermal treatment temperature is not lower than the lower limit value of the above-described range, it is easy to produce heat-shrinkable films having a shrinkage rate in the primary shrinkage direction at the time of being immersed in hot water at 70° C. for 30 seconds of 20% or less. When the thermal treatment temperature is not higher than the upper limit value of the above-described range, the shrinkage rate of the heat-shrinkable film in the primary shrinkage direction is less likely to decrease.

On the heat-shrinkable film, printing may be performed with a printing machine such as a gravure printing machine.

On the heat-shrinkable film, a corona treatment, a plasma treatment, a flame treatment, an active energy ray irradiation treatment (ultraviolet ray, a ray, ray, γ ray, electron beam, or the like), a resin coating treatment (polyamide, polyolefin, polyvinyl alcohol, polyvinylidene chloride, polyester, or the like), metal deposition, or the like may be performed in order to impart specific performance.

(Mechanism of Action)

The heat-shrinkable film of the present invention described above is a heat-shrinkable film that contains polyester containing 95 mol % or more of terephthalic acid as a dicarboxylic acid component and 50 mol % or more of ethylene glycol and 15 mol % or more of cyclohexanedimethanol as a diol component. Since the shrinkage rate in the primary shrinkage direction when the heat-shrinkable film is immersed in hot water at 70° C. for 30 seconds is 20% or less, and the shrinkage rate in the primary shrinkage direction when the heat-shrinkable film is immersed in hot water at 80° C. for 30 seconds is 45% to 65%, that is, the shrinkage of the heat-shrinkable film becomes mild in a relatively low temperature range, and the heat-shrinkable film shrinks slowly, when the heat-shrinkable film is applied to a container in which the difference between the diameter of the body portion and the diameter of the mouth portion is large, a wrinkle or a sink mark is less likely to be generated in the mouth portion.

On the other hand, in the heat-shrinkable polyester-based film described in Patent Document 1, since the hot water shrinkage rate of the polyester-based film in the primary shrinkage direction is 5% to 60% at a treatment temperature of 70° C. for a treatment time of five seconds and 75% or more at 85° C. for five seconds, the heat-shrinkable film shrinks rapidly in a relatively low temperature region, and as a result, a wrinkle or a sink mark is likely to be generated in the mouth portion.

In addition, in the heat-shrinkable film of the present invention, since the shrinkage rate in the primary shrinkage direction when the heat-shrinkable film is immersed in hot water at 98° C. for 30 seconds is 65% or more, when applied to a container in which the difference between the diameter of the body portion and the diameter of the mouth portion is large, the heat-shrinkable film sufficiently shrinks in the mouth portion.

<Heat-Shrinkable Label>

A heat-shrinkable label of the present invention has the heat-shrinkable film of the present invention and an adhesive layer provided on one surface of the heat-shrinkable film.

The heat-shrinkable label of the present invention may further have a release paper for protecting the surface of the adhesive layer.

The heat-shrinkable label of the present invention is produced by, for example, applying an adhesive to a surface of a long heat-shrinkable film having the primary shrinkage direction in the longitudinal direction to form an adhesive layer, covering the surface of the adhesive layer with a long release paper, and then half-cutting the heat-shrinkable film and the adhesive layer to a predetermined size with the release paper left on the surface of the adhesive layer.

Examples of the adhesive include an acrylic adhesive, a rubber-based adhesive, a silicone-based adhesive, and the like.

The heat-shrinkable label of the present invention is put into a well-known label application device such as a roll-on shrink application machine and is applied to a container such as a vial bottle, thereby serving as a label.

The label is applied to the container such as a vial bottle using the label application device as follows.

While the container is conveyed, the heat-shrinkable label from which the release paper has been peeled off is pressed against the container such that the adhesive layer of the heat-shrinkable label comes into contact with the container. When the container against which the heat-shrinkable label is pressed rotates around the central axis of the container, a heat-shrinkable label 200 is wrapped around a container 100 such that the primary shrinkage direction of the heat-shrinkable film is along the circumferential direction of the container and, as shown in FIG. 1, the heat-shrinkable label 200 is also positioned around a mouth portion 104 of the container 100.

While the container 100 is rotated around the central axis of the container 100, hot air is blown from a blower to the heat-shrinkable label 200 wrapped around the container 100, and, as shown in FIG. 1, the heat-shrinkable label 200 is shrunk in accordance with the shape of the container 100. The label is applied to the body portion 102 and the mouth portion 104 of the container 100 as described above.

EXAMPLES

Hereinafter, the present invention will be more specifically described using examples, but the present invention is not limited to these examples.

(Glass Transition Temperature (Tg))

Midpoint glass transition temperatures were measured by the DSC method using a thermal analysis system (METTLER TA3000 manufactured by Mettler Toledo) according to JIS K 7121-1987 under a condition of a temperature rise rate of 10° C./min.

(Shrinkage Rate)

Heat-shrinkable films sampled to sizes of 100 mm in length and 100 mm in width were immersed in hot water at a predetermined temperature for 30 seconds. The heat-shrinkable films were removed from the hot water, and vertical and horizontal dimension changes were measured, respectively, with a ruler having a least count of 0.5 mm. According to the following formula, the shrinkage rate was obtained in each of the vertical direction (primary shrinkage direction) and in the horizontal direction (direction orthogonal to the primary shrinkage direction).

$$\text{Shrinkage rate (\%)} = \{100 \text{ (mm)} - \text{length after immersion (mm)}\}/100 \text{ (mm)} \times 100$$

(Application Adequacy)

The following two vial bottles were prepared as containers.

Domestic vial bottle: 60 mm in height, 25 mm in outer diameter of body portion, and 20 mm in outer diameter of mouth portion Vial bottle for overseas: 100 mm in height, 53 mm in outer diameter of body portion, and 20 mm in outer diameter of mouth portion Heat-shrinkable labels half-cut to predetermined sizes in accordance with the vial bottles were put into a label application device and were wrapped around the vial bottles such that the longitudinal direction (primary shrinkage direction) of the heat-shrinkable label was along the circumferential direction of the vial bottle. Hot air was blown from a blower to the heat-shrinkable labels, and the heat-shrinkable labels were applied to the vial bottles. The temperature of the hot air from the blower was 20° C., and the time taken for the vial bottles to pass the front of the blower was five seconds.

The appearances of the labels applied to the vial bottles were observed, and a wrinkle or a sink mark was evaluated according to the following standards.

O: There is neither a wrinkle nor a sink mark.

X: There is a wrinkle or a sink mark.

The appearances of the labels applied to the vial bottles were observed, and the insufficiency of shrinkage was evaluated according to the following standards.

O: Shrinkage is not insufficient.

X: Shrinkage is insufficient.

(Polyester)

As polyester, polyesters A to E shown in Table 1 were prepared.

TABLE 1

| Polyester | | A | B | C | D | E |
|---|---|---|---|---|---|---|
| Dicarboxylic acid component (mol %) | TPA | 100 | 100 | 100 | 100 | 100 |

TABLE 1-continued

| Polyester | | A | B | C | D | E |
|---|---|---|---|---|---|---|
| Diol component (mol %) | EG | 69 | 74 | 72 | 69 | 74 |
| | CHDM | 26 | 17 | 23 | 26 | 21 |
| | DEG | 5 | 9 | 5 | 5 | 5 |
| Tg (° C.) | | 80 | 70 | 80 | 80 | 80 |

TPA: Terephthalic acid
EG: Ethylene glycol
CHDM: 1,4-Cyclohexanedimethanol
DEG: Diethylene glycol (Inert Particles)

As inert particles, a masterbatch in which silicon dioxide particles were dispersed in polyester (manufactured by Bell Polyester Products, Inc., FMS20, the average particle diameter of the silicon dioxide particles: 2.7 μm) was prepared.

Example 1 and Comparative Examples 1 to 4

Resin materials prepared by adding the inert particles to a polyester shown in Table 2 at a proportion shown in Table 2 were supplied to a vacuum vent-type twin-screw extruder, melted at 270° C., and extruded onto a water-cooled cast roll controlled at 25° C. from a T die, thereby obtaining unstretched films.

Figure 2:
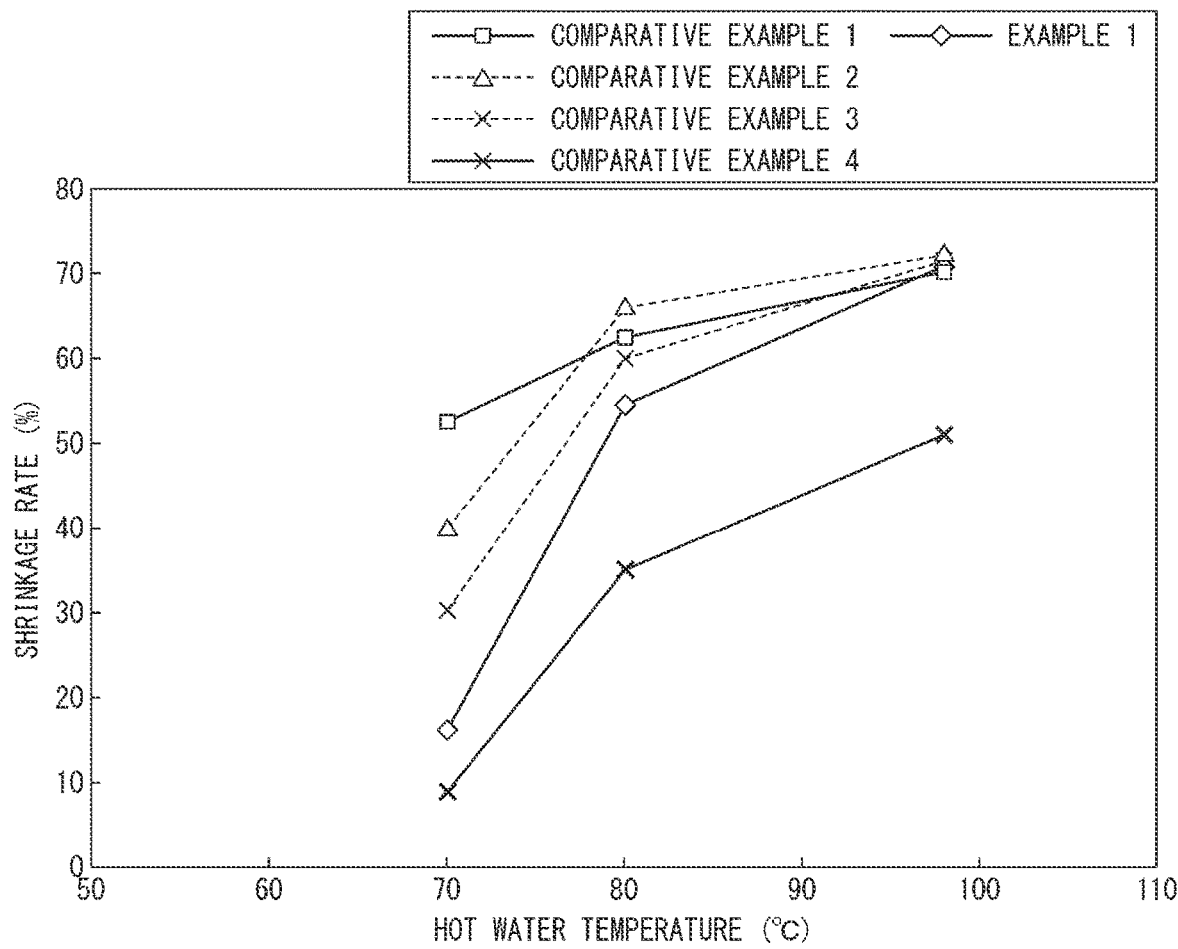
FIG. 2 is a graph showing a change in the shrinkage rates of heat-shrinkable films in examples with respect to the temperatures of hot water.

The unstretched films were supplied to a vertical stretching device, stretched under stretching conditions shown in Table 2, then, guided to a tenter (horizontal stretching device), and stretched under stretching conditions shown in Table 2. After that, the films were thermally treated at thermal treatment temperatures shown in Table 2 and wound into a roll shape with a winder, thereby obtaining heat-shrinkable films having a thickness of 45 μm. The shrinkage rates are shown in Table 2 and FIG. 2.

An adhesive (acrylic adhesive) was applied to surfaces of the heat-shrinkable films to form 17 μm-thick adhesive layers, the surfaces of the adhesive layers were covered with release papers, and then the heat-shrinkable films and the adhesive layers were half-cut to predetermined sizes with the release papers left on the surface of the adhesive layer, thereby obtaining heat-shrinkable labels. The results of application adequacy are shown in Table 2.

TABLE 2

| | | | Example 1 | Comparative Example 1 | Comparative Example 2 | Comparative Example 3 | Comparative Example 4 |
|---|---|---|---|---|---|---|---|
| Polyester | | | A | B | C | D | E |
| Proportion of inert particles (mass %) | | | 0.033 | 0.033 | 0.055 | 0.033 | 0.066 |
| Longitudinal direction | Stretch ratio (times) | | 4.2 | 4 | 4 | 4 | 4 |
| | Stretching temperature (° C.) | | 90 | 88 | 88 | 91 | 93 |
| Width direction | Stretch ratio (times) | | 1.08 | 1.00 | 1.07 | 1.09 | 1.03 |
| | Stretching temperature (° C.) | | 78 | 68 | 80 | 67 | 77 |
| Thermal treatment temperature (° C.) | | | 85 | 70 | 87 | 73 | 76 |
| Shrinkage rate in primary shrinkage direction (%) | 70° C., 30 seconds | | 16.2 | 52.5 | 40.0 | 30.4 | 9.0 |
| | 80° C., 30 seconds | | 54.5 | 62.5 | 66.0 | 60.0 | 35.0 |
| | 98° C., 30 seconds | | 71.0 | 70.0 | 72.2 | 71.6 | 51.0 |
| Shrinkage rate in direction orthogonal to primary shrinkage direction (%) | 98° C., 30 seconds | | 7.2 | 2.5 | 10.3 | 6.7 | 10 |
| Application adequacy | Domestic vial bottle | Wrinkle or sink mark | O | X | X | X | O |
| | | Shrinkage insufficiency | O | O | O | O | O |
| | Vial bottle for overseas | Wrinkle or sink mark | O | X | X | O | — |
| | | Shrinkage insufficiency | O | O | O | O | X |

In Comparative Examples 1 and 2, the shrinkage rates at 98° C. were sufficient, but a wrinkle was easily generated in both vial bottles during the application of the labels.

In Comparative Example 3, the shrinkage rate at 98° C. was sufficient, but a wrinkle was easily generated in the small domestic vial bottle.

In Comparative Example 4, the shrinkage rate at 98° C. was insufficient, and a wrinkle was easily generated in the large vial bottle for overseas during the application of the label.

INDUSTRIAL APPLICABILITY

The heat-shrinkable film of the present invention is useful as a label for containers in which the diameter of the body portion and the diameter of the mouth portion significantly differ from each other such as a vial bottle.

REFERENCE SIGNS LIST

100 Container
102 Body portion
104 Mouth portion
200 Heat-shrinkable label

What is claimed is:

1. A heat-shrinkable film comprising:
polyester, wherein the polyester comprises a dicarboxylic acid component and a diol component, the dicarboxylic component comprising 95 mol % or more of terephthalic acid, and the diol component comprising 67 to 71 mol % of ethylene glycol and 24 to 28 mol % of cyclohexanedimethanol, and 3 to 7 mol % of diethylene glycol,
wherein the polyester is at least 95 mass % of the total composition,
a shrinkage rate in a primary shrinkage direction when the heat-shrinkable film is immersed in hot water at 70° C. for 30 seconds is 20% or less,
a shrinkage rate in the primary shrinkage direction when the heat-shrinkable film is immersed in hot water at 80° C. for 30 seconds is 45% to 65%, and
a shrinkage rate in the primary shrinkage direction when the heat-shrinkable film is immersed in hot water at 98° C. for 30 seconds is 65% or more,
the heat-shrinkable film is produced by a method comprising melt-extruding a resin material containing polyester to obtain an unstretched film, stretching the unstretched film in the longitudinal direction and then stretching the unstretched film in the width direction to obtain a stretched film, and thermally treating the stretched film,
the stretch ratio at the time of stretching the unstretched film in the longitudinal direction is 3.5 to 5 times,
the stretching temperature at the time of stretching the unstretched film in the longitudinal direction is higher than a glass transition temperature of the polyester by 5° C. to 15° C.,
the stretch ratio at the time of stretching the unstretched film in the width direction is 1 to 1.3 times,
the stretching temperature at the time of stretching the unstretched film in the width direction is higher than the glass transition temperature by −5° C. to 10° C., and
the thermal treatment temperature at the time of thermally treating the stretched film is higher than the stretching temperature at the time of stretching the unstretched film in the width direction by 0° C. to 20° C.

2. The heat-shrinkable film according to claim 1, wherein the polyester has a glass transition temperature of 63° C. to 85° C.

3. The heat-shrinkable film according to claim 1, further comprising:
inert particles.

4. The heat-shrinkable film according to claim 3, wherein the inert particles have an average particle diameter of 1.5 to 3.0 μm.

5. The heat-shrinkable film according to claim 3, wherein a proportion of the inert particles in the heat-shrinkable film is 0.01 to 0.08 mass %.

6. The heat-shrinkable film according to claim 3, wherein the proportion of components other than the polyester and inert particles in the heat-shrinkable film is 0 to less than 5 mass %.

7. A heat-shrinkable label comprising:
the heat-shrinkable film according to claim 1; and
an adhesive layer provided on one surface of the heat-shrinkable film.

* * * * *